Patented June 25, 1935

2,005,840

UNITED STATES PATENT OFFICE 2,005,840

INSULATING MATERIAL

Rudolf Engelhardt, Leverkusen-I. G. Werk, Germany, assignor to I. G. Farbenindustrie Aktiengesellschaft, Frankfort-on-the-Main, Germany No Drawing. Application November 10, 1932, Serial No. 642,131. In Germany November 11, 1931

4 Claims. (Cl. 252—1)

The present invention relates to new insulating materials for electrical purposes.

The new insulating materials consist of chlorodiphenyls as they are obtainable, for instance, by chlorinating diphenyls according to any desired manner. These chlorodiphenyls being liquid at room temperature display a disruptive strength of about 130-140 KV/cm, and should, advantageously, possess a chlorine content of between about 40 and about 60%. They are exposed to an electrical high tension field until disruptive discharge occurs. The chlorodiphenyls then are subjected to a purification and, if necessary, to a neutralization process, for example, by filtering the same through Florida earth or by distilling the same at normal or reduced pressure. For example, a distilled chlorinated diphenyl of a chlorine content of 55-56% possessed a disruptive strength of an average of 136 KV/cm at eleven disruptive discharges. After the eleventh disruptive discharge the chlorodiphenyl was distilled again. The chlorodiphenyl thus obtained possessed a disruptive strength of an average of 176 KV/cm. The disruptive strength of the respective chlorodiphenyl has, therefore, increased for about 30%.

In general the disruptive strength of the chlorodiphenyls is increased by the disclosed treatment to a strength of at least 150 KV/cm, in most cases the strength is increased to about 160 KV/cm.

Obviously the new insulating materials may be applied alone or in admixture with other insulating materials, for instance, chlorinated hydrocarbons, such as polychlorinated benzenes and polychlorinated naphthalenes. They are especially suitable for the use in electrical transformers, etc.

I claim:—

1. Insulating material comprising a chlorodiphenyl being liquid at room temperature which has been exposed to an electrical high tension field until disruptive discharge has occurred and then purified.

2. Insulating material comprising a chlorodiphenyl containing between about 40 and about 60% of chlorine and being liquid at room temperature, which has been exposed to an electrical high tension field until disruptive discharge has occurred and then purified.

3. Insulating material comprising an electrically disrupted chlorodiphenyl being liquid at room temperature and containing between about 40 and about 60% of chlorine, displaying a disruptive strength of more than 150 KV/cm, and having a disruptive strength of 136 KV/cm before the disruptive discharge.

4. Process of increasing the disruptive strength of a chlorodiphenyl being liquid at room temperature, which comprises exposing said material to disruptive discharges in an electrical high tension field and purifying it.

RUDOLF ENGELHARDT.